United States Patent Office 3,236,843
Patented Feb. 22, 1966

3,236,843
1,4-DIHYDROXY-2-AMINOALKYL (THIO OR SULFONYL) ANTHRAQUINONES
James M. Straley, David J. Wallace, and John G. Fisher, Kingsport, Tenn., assignors to Eastman Kodak Company, Rochester, N.Y., a corporation of New Jersey
No Drawing. Filed Aug. 27, 1962, Ser. No. 219,758
10 Claims. (Cl. 260—247.1)

This invention relates to new anthraquinone compounds, their preparation and their application for the dyeing or coloring of acrylonitrile polymers, especially in the form of textile materials.

We have discovered that the new anthraquinone compounds having the formula:

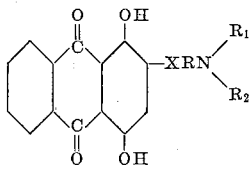

wherein X represents a thio radical or a sulfonyl radical, R represents an alkylene radical having 2 to 3 carbon atoms, $R_1$ and $R_2$ each represents a member selected from the class consisting of a hydrogen atom, an alkyl radical having 1 to 4 carbon atoms and an allyl radical, and wherein

collectively represents a morpholinyl radical, a piperidyl radical, a 4-methylpiperidyl radical or a 4-methylpiperazinyl radical, and the quaternary ammonium forms thereof, are valuable dyestuffs for acrylonitrile polymers, especially acrylonitrile polymer textile materials. These compounds have excellent affinity for said acrylonitrile polymers and yield bright yellow to orange dyeings thereon which have good to excellent fastness to light, washing, gas and sublimation.

Unless otherwise indicated, the term "acrylonitrile polymer" as used herein and in the claims includes polymers consisting essentially of polymerized acrylonitrile (i.e., acrylonitrile polymers containing at least 85% by weight of acrylonitrile) as well as modified acrylonitrile polymers known in the art as modacrylics. The modacrylics contain at least 40% but less than 85% acrylonitrile by weight. The modacrylic fibers disclosed in U.S. Patents 2,811,409, 2,831,826 and 2,843,572, for example, can be dyed with our new anthraquinone compounds.

The acrylonitrile polymer fibers sold under the trademarks "Verel" and "Orlon," in the form of filaments, yarn and fabric, for example, are illustrative of the acrylonitrile polymer textile materials that can be dyed with our new anthraquinone compounds.

The non-quaternary anthraquinone compounds of our invention wherein X is a thio radical are readily prepared by reacting a 2-halogen-1,4-dihydroxyanthraquinone compound, such as 2-bromo-1,4-dihydroxyanthraquinone or 2-chloro-1,4-dihydroxyanthraquinone, for example, with an aminoalkanethiol compound having the formula:

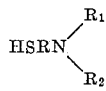

wherein R, $R_1$ and $R_2$ have the meaning previously assigned to them.

The non-quaternary anthraquinone compounds of our invention wherein X is a sulfonyl radical are prepared by oxidizing the corresponding thio compounds. This oxidation can be carried out by known means for oxidizing a thio compound to a sulfonyl compound. The oxidation can be carried out by oxidizing the thio compound with hydrogen peroxide in an organic acid medium, such as acetic acid.

The quaternary ammonium compounds of our invention are obtained by converting the non-quaternary compounds to their quaternary ammonium forms using known procedures.

Quaternization may be carried out in an inert solvent using the known quaternizing agents. A dialkyl sulfate, an alkyl chloride, an alkyl bromide, an alkyl iodide, an aralkyl chloride, an aralkyl bromide or an alkyl ester of para-toluene sulfonic acid, for example can be employed. Specific quaternizing agents include, for example, dimethyl sulfate, diethyl sulfate, di(n-propyl) sulfate, diisopropyl sulfate, di(n-butyl)sulfate, ethyl bromide, ethyl chloroide, methyl iodide, ethyl iodide, isopropyl iodide, n-propyl iodide, n-butyl iodide, lauryl iodide, benzyl chloride, benzyl bromide, methyl p-toluene sulfonate, ethyl p-toluene sulfonate, n-propyl p-toluene sulfonate and n-butyl p-toluene sulfonate.

Inert solvents that can be used in the quaternization reaction include, for example, dimethyl formamide, acetone, ethylene glycol monomethyl ether, ethylene glycol monoethyl ether, isopropanol, n-butanol, chlorobenzene and nitrobenzene.

The following examples illustrate the invention:

EXAMPLE 1

3.16 grams of 2-bromo-1,4-dihydroxyanthraquinone were added to a solution prepared from 0.56 gram of KOH, 30 cc. of ethylene glycol monomethyl ether and 1.47 grams of β-N-morpholinylethanethiol. The resulting reaction mixture was refluxed, with stirring, for 8 hours and then cooled. The product which precipitated was recovered by filtration, washed with water, and dried. The dye compound thus obtained has the formula:

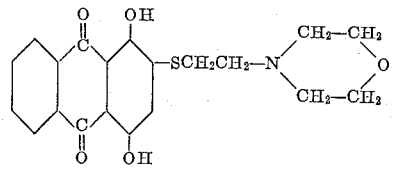

It dyes acrylonitrile polymer textile materials such as Verel and Orlon, orange shades.

EXAMPLE 2

1 gram of the dye compound obtained in Example 1 and 10 cc. of acetic acid were heated together, with stirring, on a steam bath. 2 cc. of 30% $H_2O_2$ were added dropwise over a period of about 1 hour and heating was continued for 1 hour longer. The reaction mixture was then drowned in 20 times its volume of water and the reaction product which precipitated was recovered by filtration, washed with water and dried. The dye compound obtained has the formula:

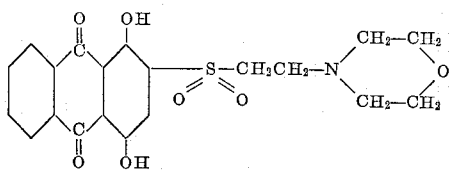

It dyes acrylonitrile polymer textile materials, such as Verel and Orlon, orange shades of a yellower hue than the dyeings obtained with the dye of Example 1.

EXAMPLE 3

0.5 gram of the dye compound obtained in Example 1 and 5 cc. of dimethyl sulfate were heated together on a steam bath for 45 minutes. After cooling, the reaction mixture was drowned in 5 times its volume of ethyl ether and the product which precipitated was recovered by filtration, washed with ethyl ether and dried. The methyl methosulfate quaternary ammonium salt form of the dye compound of Example 1 was obtained. It is water soluble and dyes acrylonitrile polymer textile materials, such as Verel and Orlon, bright orange shades.

EXAMPLE 4

To a solution of 0.3 gram of KOH in 10 cc. of ethylene glycol monomethyl ether were added 0.67 gram of β-N-n-butylaminoethanethiol

(HSCH$_2$CH$_2$NCH$_2$CH$_2$CH$_2$CH$_3$)

and then 1.8 grams of 2-bromo-1,4-dihydroxyanthraquinone. The reaction mixture was refluxed, with stirring, for 2.5 hours, drowned in 10 times its volume of water and neutralized with a few drops of hydrochloric acid. The dye compound which precipitated was recovered by filtration, washed with water and dried. It dyes acrylonitrile polymer textile materials, such as Verel and Orlon, orange shades.

EXAMPLE 5

Example 1 was repeated using 1.45 grams of β-N-piperidylethanethiol in place of β-N-morpholinylethanethiol. The dye compound obtained dyes acrylonitrile polymer textile materials, such as Verel and Orlon, orange shades.

EXAMPLE 6

Example 1 was repeated using 1.6 grams of 1-(2-mercaptoethyl)-4-methylpiperazine

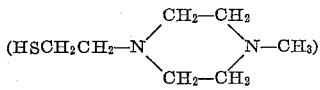

in place of β-N-morpholinylethanethiol. The dye compound obtained dyes acrylonitrile polymer textile materials, such as Verel and Orlon, orange shades.

EXAMPLE 7

Example 1 was repeated using 1.33 grams of β-N-diethylaminoethanethiol [HSCH$_2$CH$_2$N(C$_2$H$_5$)$_2$] in place of β-N-morpholinylethanethiol. The dye compound obtained dyes acrylonitrile polymer textile materials, such as Verel and Orlon, orange shades.

EXAMPLE 8

Example 1 was repeated using 1.61 grams of β-N-di-n-propylaminoethanethiol [HSCH$_2$CH$_2$N(n-C$_3$H$_7$)$_2$] in place of β-N-morpholinylethanethiol. The dye compound obtained dyes acrylonitrile polymer textile materials, such as Verel and Orlon, orange shades.

EXAMPLE 9

Example 1 was repeated using 1.89 grams of β-di-n-butylaminoethanethiol in place of β-N-morpholinylethanethiol. The dye compound obtained dyes acrylonitrile polymer textile materials, such as Verel and Orlon, orange shades.

EXAMPLE 10

Example 1 was repeated using 1.1 grams of β-N-dimethylaminoethanethiol in place of β-N-morpholinylethanethiol. The dye compound obtained dyes acrylonitrile polymer textile materials, such as Verel and Orlon, orange shades.

EXAMPLE 11

1 grams of the dye compound of Example 10 was dissolved by heating in 15 cc. of chlorobenzene. Two cc. of benzyl bromide were added and the resulting reaction mixture was heated at 60–70° C. for 2.5 hours. After cooling, the reaction mixture was drowned in 5 times its volume of hexane and the product which precipitated was recovered by filtration, washed with hexane and dried. The benzyl bromide quaternary ammonium salt form of the dye of Example 10 was obtained. It is water soluble and dyes acrylonitrile polymer textile materials, such as Verel and Orlon, orange shades.

EXAMPLE 12

1 gram of the dye compound of Example 7, 2 grams of dimethyl sulfate and 10 cc. of chlorobenzene are heated together for 1 hour on a steam bath. After cooling, the dye compound, the methyl methosulfate quaternary ammonium salt form of the dye compound of Example 7, which precipitates is recovered by filtration and dried. It is water soluble and dyes acrylonitrile polymer textile materials, such as Verel and Orlon, bright orange shades.

EXAMPLE 13

0.7 gram of the dye compound of Example 2 and 5 cc. of methyl p-toluenesulfonate are heated together for 2 hours on a steam bath. After cooling the reaction mixture is diluted with 5 times its volume of xylene and the product which precipitates is recovered by filtration, washed with xylene and dried. The methyl p-toluenesulfonate quaternary ammonium salt form of the dye compound of Example 2 is obtained. It is water soluble and dyes acrylonitrile polymer textile materials, such as Verel and Orlon, reddish-yellow shades.

EXAMPLE 14

1 gram of the dye compound of Example 8 and 5 cc. of n-butyl iodide are heated together to reflux and then cooled. The reaction mixture is then diluted with 5 times its volume of petroleum ether and the product which precipitates is recovered by filtration, washed with petroleum ether and dried. The n-butyl iodide quaternary ammonium salt form of the dye compound of Example 8 is obtained. It is water soluble and dyes acrylonitrile polymer textile materials, such as Verel and Orlon, orange shades.

EXAMPLE 15

By the use of 1.2 grams of 1-dimethylamino-2-mercaptopropane in Example 1 in place of β-N-morpholinylethanethiol 1,4-dihydroxy-2-S—CH—CH$_2$—N(CH$_3$)$_2$
$\quad\quad\quad\quad\quad\quad\quad\quad$|
$\quad\quad\quad\quad\quad\quad\quad\quad$CH$_3$ anthraquinone is obtained. It dyes acrylonitrile polymer textile materials, such as Verel and Orlon, orange shades.

EXAMPLE 16

By the use of 1.45 grams of 3-diethylamino-1-propanethiol in Example 1 in place of β-N-morpholinylethanethiol 1,4-dihydroxy-2-S—CH$_2$CH$_2$CH$_2$—N(C$_2$H$_5$)$_2$ anthraquinone is obtained. It dyes acrylonitrile polymer textile materials, such as Verel and Orlon, orange shades.

EXAMPLE 17

Example 2 is repeated using 1 gram of the dye compound of Example 7.

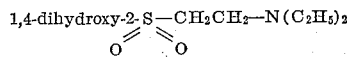

anthraquinone is obtained. It dyes acrylonitrile polymer textile materials, such as Verel and Orlon, yellowish-orange shades.

EXAMPLE 18

By the use of 1.45 grams of 2-n-butylamino-1-propanethiol in Example 1 in place of β-N-morpholinylethanethiol

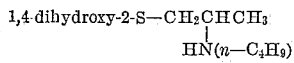

anthraquinone is obtained. It dyes acrylonitrile polymer textile materials, such as Verel and Orlon, orange shades.

EXAMPLE 19

By the use of 1.61 grams of 3-N-morpholinylpropanethiol in Example 1 in place of β-N-morpholinylethanethiol

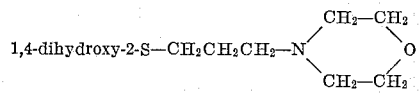

anthraquinone is obtained. It dyes acrylonitrile polymer textile materials, such as Verel and Orlon, orange shades.

EXAMPLE 20

By the use of 2.03 grams of 3-dibutylamino-1-propanethiol [J.A.C.S., vol. 70, pages 950–5 (1948)] in Example 1 in place of β-N-morpholinylethanethiol 1,4-dihydroxy-2-S—CH₂CH₂CH₂N(C₄H₉)₂-anthraquinone is obtained It dyes acrylonitrile polymer textile materials, such as Verel and Orlon, orange shades.

EXAMPLE 21

By the use of 0.77 gram of 2-aminoethanethiol in Example 1 in place of β-N-morpholinylethanethiol, 1,4-dihydroxy-2-S—CH₂CH₂NH₂ anthraquinione is obtained. It dyes acrylonitrile polymer textile materials, such as Verel and Orlon, orange shades.

EXAMPLE 22

Example 1 is repeated using 0.91 gram of 2-methylaminoethanethiol in place of β-N-morpholinylethanethiol.

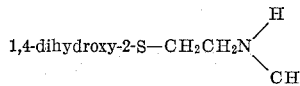

anthraquinone is obtained. It dyes acrylonitrile polymer textile materials, such as Verel and Orlon, orange shades.

EXAMPLE 23

Example 1 is repeated using 1.6 grams of 3-(1-piperidyl)propyl mercaptan [J.A.C.S., 69, 519–21 (1947)] in place of β-N-morpholinylethanethiol.

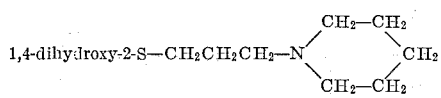

anthraquinone is obtained. It dyes acrylonitrile polymer textile materials, such as Verel and Orlon, orange shades.

EXAMPLE 24

Example 2 is repeated using 1 gram of the dye compound of Example 6.

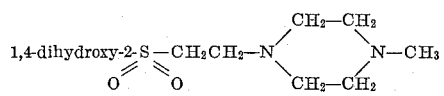

anthraquinone is obtained. It dyes acrylonitrile polymer textile materials, such as Verel and Orlon, yellowish-orange shades.

The following tabulation further illustrates the 1,4-dihydroxy-2-substituted anthraquinone compounds of our invention together with the color they dye acrylonitrile polymer materials. The substituent present in the 2-position is set forth in the tabulation. These compounds are prepared in accordance with the procedure described hereinbefore.

TABLE I

| Example No. | Substituent in 2-position | Color |
|---|---|---|
| 25 | —SCH₂CH₂NHC₂H₅ | Orange. |
| 26 | —SCH₂CH₂NH(n-C₃H₇) | Do. |
| 27 | —SCH₂CH₂NH(iso-C₃H₇) | Do. |
| 28 | —SCH₂CH₂NH(iso-C₄H₉) | Do. |
| 29 | —SCH₂CH₂NH(sec.-C₄H₉) | Do. |
| 30 | —SCH₂CH₂NH(tert.-C₄H₉) | Do. |
| 31 | —SCH₂CH₂NHCH₂CH=CH₂ | Do. |
| 32 | —SCH₂CH₂N(CH₃)₂ | Do. |
| 33 | —SCH₂CH₂N(i-C₃H₇)₂ | Do. |
| 34 | —SCH₂CH₂N(iso-C₄H₉)₂ | Do. |
| 35 | —SCH₂CH₂N(sec-C₄H₉)₂ | Do. |
| 36 | —SCH₂CH₂N(CH₂CH=CH₂)₂ | Do. |
| 37 | —SCH₂CH₂CH₂N(CH₃)₂ | Do. |
| 38 | —SCH₂CH₂CH₂N(C₂H₅)₂ | Do. |
| 39 | —SCHCH₂N(CH₃)₂ with CH₃ branch | Do. |
| 40 | —S(=O)(=O)—CH₂CH₂N(CH₂CH₂)₂CH₂ (morpholino sulfone) | Yellowish-orange. |
| 41 | —S(=O)(=O)—CH₂CH₂N(C₂H₅)₂ | Do. |
| 42 | —SCH₂CH₂N(CH₂CH₂)₂CHCH₃ | Orange. |
| 3 | —S(=O)(=O)—CH₂CH₂N(CH₂CH₂)₂CHCH₃ | Yellowish-orange. |
| 4 | —S(=O)(=O)—CH₂CH₂N(n-C₄H₉)₂ | Do. |
| 45 | —S(=O)(=O)—CH₂CH₂N(CH₂CH=CH₂)₂ | Do. |
| 46 | —S(=O)(=O)—CH₂CH₂CH₂N(C₂H₅)₂ | Do. |
| 7 | —S(=O)(=O)—CH₂CH₂CH₂N(CH₂CH₂)₂CH₂ | Do. |

Additional quaternary ammonium compounds of our invention together with the color they dye acrylonitrile polymer materials are set forth hereinafter.

TABLE II

| Example No. | Compound of— | Quaternizing agent | Color |
|---|---|---|---|
| 48 | Example 4 | Dimethyl sulfate | Orange. |
| 49 | Example 5 | do | Do. |
| 50 | Example 6 | do | Do. |
| 51 | Example 9 | Benzyl bromide | Do. |
| 52 | Example 16 | do | Do. |
| 53 | Example 30 | n-Butyl iodide | Do. |
| 54 | Example 32 | do | Do. |
| 55 | Example 34 | Dimethyl sulfate | Do. |
| 56 | Example 36 | do | Do. |
| 57 | Example 37 | do | Do. |
| 58 | Example 38 | do | Do. |
| 59 | Example 39 | do | Do. |
| 60 | Example 40 | do | Yellowish-orange. |
| 61 | Example 42 | do | Orange. |

Aminoethanethiol compounds having the formula:

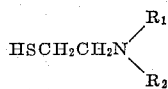

wherein $R_1$ and $R_2$ have the meaning previously assigned to them have been prepared by a number of methods. One method involves the reaction of aminoethyl halides with hydrosulfides of the alkali metals. Another method is based on the condensation of aminoethyl halides with thiourea followed by alkaline hydrolysis. A third and more preferred method is the mercaptoethylation of primary and secondary amines by reaction with ethylene sulfide. This last process leaves much to be desired because of the difficulties encountered in handling ethylene sulfide. Ethylene sulfide readily polymerizes and cannot be stored safely in large quantities. Hence this process is not suitable for mercaptoethylation on a large scale.

The aminoethanethiol compounds having the formula given hereinbefore can also be prepared by reacting 2-hydroxyethylthiolcarbonate esters and 2-mercaptoethylcarbonate esters with the primary and secondary amines having the formula:

wherein $R_1$ and $R_2$ have the meaning previously assigned to them. This latter method is described and claimed in copending U.S. application Ser. No. 115,932 filed June 9, 1961 by Donald L. Fields and Delbert D. Reynolds. Ethyl 2-hydroxyethylthiolcarbonate and ethyl 2-mercaptoethylcarbonate are illustrative of the aforesaid ester compounds that can be employed. The preparation of these compounds and the manner in which they are used to prepare aminoethanethiol compounds are described hereinafter.

*Preparation of ethyl 2-hydroxyethylthiolcarbonate*

A mixture of one liter of benzene, 542 g. (5 moles) of ethyl chloroformate and 200 ml. of water was stirred at 15° C. A solution consisting of 1.5 l. of water, 200 g. (5 moles) of sodium hydroxide and 390 g. (5 moles) of 2-mercaptoethanol was added over a period of one hour. During this time, the reaction temperature was maintained between 15° and 20° C. After stirring for an additional 15 minutes, the reaction mixture was acidified with hydrochloric acid. The benzene layer was separated, washed once with 500 ml. of cold water, separated and dried over anhydrous MgSO$_4$. Twenty-five grams of stearic acid was added and the benzene removed under vacuum. The ethyl 2-hydroxyethylthiolcarbonate was then distilled through an 18" glass-helices-packed column equipped with a variable reflux ratio stillhead. B.P. 84° C./0.4 mm.; $n_D^{25}$ 1.4782; yield 653 g. (87 percent).

*Preparation of ethyl 2-mercaptoethylcarbonate*

2-mercaptoethanol (156 g., 2.0 moles) and ethyl chloroformate (434 g., 4.0 moles) were heated on a steam bath under a reflux condenser for seven hours. Crude ethyl 2-mercaptoethylcarbonate was collected by distillation, B.P. 74–80° C./7.0 mm., $n_D^{25}$ 1.4568. Yield, 105 g. (35 percent).

Anal. Calcd. for $C_5H_{10}O_3S$: C, 40.0; H, 6.7; S, 21.3. Found: C, 40.2; H, 6.7; S, 21.3.

*Mercaptoethylation with ethyl 2-hydroxyethylthiolcarbonate*

General procedure: A mixture of 1.0 mole of ethyl 2-hydroxyethylthiolcarbonate, 3.0 moles of amine and 500 ml. of toluene was refluxed overnight under an efficient reflux condenser. Product isolation was effected by distillation under reduced pressure through a 14" glass-helices-packed column. The results are tabulated in Table III.

TABLE III

| Amine | Product | B.P. range, °C./mm. | Percent yield of aminoethanethiol |
|---|---|---|---|
| Piperidine | 2-piperidylethanethiol. | 81–87/12 | 62 |
| 4-methylpiperidine | 2-(4-methylpiperidyl)ethanethiol. | 101–104/12 | 59 |
| Morpholine | 2-morpholinylethanethiol. | 107–111/26 | 62 |
| Diethylamine | 2-diethylaminoethanethiol. | 73–74/34 | 61 |
| Di-n-butylamine | 2-di-n-butylaminoethanethiol. | 64/0.7 | 73 |

*Mercaptoethylation with ethyl 2-mercaptoethylcarbonate*

General procedure: A mixture of amine (3.0 moles) and anhydrous toluene (500 ml.) was brought to reflux under an efficient condenser topped by an acetone-Dry Ice trap. Ethyl 2-mercaptoethylcarbonate (150 g., 1.0 mole) was then added dropwise to the reaction mixture over a one-hour period. After refluxing overnight, the 2-aminoethanethiol was isolated by distillation through a 14" glass-helices-packed column equipped with a variable take-off head.

The results are tabulated in Tables IV and V.

TABLE IV

[$RNH_2 + EtOCO_2 CH_2 CH_2 SH \longrightarrow RNHCH_2 CH_2 SH + CO_2 + EtOH$]

| No. | RNH— | Percent yield | Percent purity [a] | B.P., °C./mm. | $n_D^{25}$ | Calculated C | Calculated H | Calculated N | Found C | Found H | Found N |
|---|---|---|---|---|---|---|---|---|---|---|---|
| 1 | iso-$C_3H_7$NH— | 7 | 82.2 | 56/18 | | 50.4 | 10.9 | 11.8 | 51.0 | 10.8 | 11.2 |
| 2 | n-$C_4H_9$NH— | 32 | 98.2 | 76/13 | 1.4694 | | | | | | |
| 3 | iso-$C_4H_9$NH— | 37 | 94.2 | 79/23 | 1.4645 | 54.1 | 11.3 | 10.5 | 53.8 | 11.4 | 10.6 |
| 4 | sec-$C_4H_9$NH— | 42 | 95.8 | 74/21 | 1.4670 | 54.1 | 11.3 | 10.5 | 54.2 | 11.3 | 10.4 |
| 5 | tert-$C_4H_9$NH— | 15 | 92.4 | 70/29 | | 54.1 | 11.3 | 10.5 | 54.3 | 10.6 | 10.5 |
| 6 | $CH_2=CHCH_2$NH— | 44 | 94.9 | 70/16 | 1.4931 | 51.3 | 9.4 | 12.0 | 51.5 | 9.1 | 12.9 |

[a] Purity determined by iodometric titration.

TABLE V
$$[R_2NH + EtOCO_2CH_2CH_2SH \longrightarrow R_2NCH_2CH_2SH + CO_2 + EtOH]$$

| No. | $R_2N-$ | Percent yield | Percent purity [a] | B.P., °C./mm. | $n_D^{25}$ | Calculated C | Calculated H | Calculated N | Found C | Found H | Found N |
|---|---|---|---|---|---|---|---|---|---|---|---|
| 1 | $(C_2H_5)_2N-$ | 73 | 100.0 | 85/56 | 1.4636 | | | | | | |
| 2 | $(C_3H_7)_2N-$ | 88 | 98.8 | 77/10 | 1.4614 | 59.6 | 11.8 | 8.7 | 59.5 | 11.8 | 8.5 |
| 3 | $(iso\text{-}C_3H_7)_2N-$ | 10 | 95.7 | 73/9 | 1.4670 | 59.6 | 11.8 | 8.7 | 59.3 | 11.8 | 8.7 |
| 4 | $(n\text{-}C_4H_9)_2N-$ | 91 | 100.0 | 66/0.7 | 1.4620 | | | | | | |
| 5 | $(iso\text{-}C_4H_9)_2N-$ | 89 | 100.0 | 91/10 | 1.4572 | 63.5 | 12.2 | 7.4 | 63.7 | 12.3 | 7.4 |
| 6 | $(sec\text{-}C_4H_9)_2N-$ | 20 | 95.5 | 93/8 | 1.4715 | 63.5 | 12.2 | 7.4 | 63.2 | 12.0 | 7.4 |
| 7 | $(CH_2{=}CHCH_2)_2N-$ | 92 | | 90/17 | 1.4898 | 61.1 | 9.6 | 8.9 | 61.1 | 10.1 | 9.2 |
| 8 | 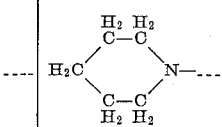 | 96 | 99.2 | 79/10 | 1.4991 | | | | | | |
| 9 | 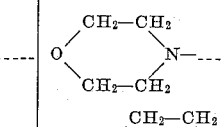 | 92 | 98.9 | 92/10 | 1.5021 | | | | | | |
| 10 | 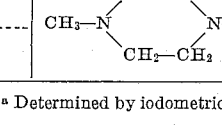 | 94 | 100.0 | 95/10 | 1.5040 | | | | | | |

[a] Determined by iodometric titration.

Since many amines have low boiling points, very low reaction temperatures are obtained at normal pressure. By conducting the reaction in a rocking-type autoclave, employing a positive displacement pump to meter the ethyl 2-hydroxyethylthiolcarbonate or the ethyl 2-mercaptoethylcarbonate into the amine-solvent mixture, yields can be significantly improved because of the higher operating temperature.

General mercaptoethylation procedure for amines of Table VI

A charge consisting of amine (3.0 moles) and benzene (150 ml.) was loaded into a stainless steel autoclave. The autoclave was sealed, placed in a rocking heater stand and heated to 125–150° C. Agitation was started at this point and ethyl 2-mercaptoethylcarbonate (150 g., 1.0 mole) was metered into the autoclave by means of a "Lapp Pulsafeeder" metering pump. This addition required approximately 15 min., and was followed by 50 ml. of benzene. Agitation was continued for 5–10 min., at the operating temperature with the final pressure reaching 500–1500 p.s.i. depending on the vapor pressure of the amine used.

The autoclave was removed from the heater stand, cooled to room temperature, vented in a hood, and the product isolated by distillation through a 14″ glass-helices-packed column equipped with a variable take-off head. In some instances the mixture from the autoclave contained a considerable amount of solid carbamate salt $$(R_2N\overset{\ominus}{C}O_2R_2\overset{\oplus}{N}H_2)$$

This material, however, was usually heat unstable and it decomposed into its components (amine and $CO_2$) before the distillation of the desired product commenced.

TABLE VI
$$[R_1R_2NH + C_2H_5OCO_2CH_2CH_2SH \rightarrow R_1R_2NCH_2CH_2SH + C_2H_5OH + CO_2]$$

| No. | $R_1R_2N-$ | Percent yield | Percent purity [a] | B.P., °C./mm. | $n_D^{25}$ |
|---|---|---|---|---|---|
| 1 | $C_2H_5NH-$ | 69 | 99.2 | 75/63 | 1.4751 |
| 2 | $C_3H_7NH-$ | 75 | 95.1 | 82/46 | 1.4720 |
| 3 | $i\text{-}C_3H_7NH-$ | 77 | 96.9 | [b] 81/64 | |
| 4 | $n\text{-}C_4H_9NH-$ | 66 | 97.2 | 81/18 | 1.4694 |
| 5 | $i\text{-}C_4H_9NH-$ | 72 | 97.2 | 76/23 | 1.4652 |
| 6 | $s\text{-}C_4H_9NH-$ | 68 | 95.3 | 83/33 | 1.4676 |
| 7 | $t\text{-}C_4H_9NH-$ | 64 | 99.2 | [c] 71/28 | |
| 8 | $(i\text{-}C_3H_7)_2N-$ | 28 | 99.0 | 73/13 | 1.4686 |
| 9 | $(s\text{-}C_4H_9)_2N-$ | 23 | 98.6 | 93/8 | 1.4723 |

[a] Purity determined by iodometric titration.
[b] M.P., 34–35° C.
[c] M.P., 41–43° C.

The aminoalkanethiol compounds used in preparing the new anthraquinone compounds of our invention are known compounds. Any that are not specifically described may be prepared by methods analogous to those used in preparing the aminoalkanethiol compounds that are specifically described. The preparation of the aminoethanethiol compounds by a new method described and claimed in copending U.S. application Serial No. 115,932, filed June 9, 1961, by Donald L. Fields and Delbert D. Reynolds has been described hereinbefore. The process described herein for the preparation of ethyl 2-mercaptoethylcarbonate is also the invention of Fields and Reynolds and is described and claimed in their U.S. application Serial No. 115,932.

For purposes of clarity it is here noted that 2-morpholinylethanethiol and β-N-morpholinylethanethiol refer to

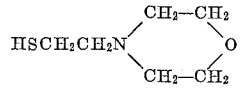

and that 2-piperidylethanethiol and β-N-piperidylethanethiol refer to

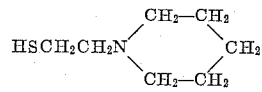

As noted hereinbefore the non-quaternary anthraquinone compounds of our invention can be obtained in their quaternary ammonium salt form by treatment with a quaternizing agent using known procedures. Thus, for example, the methyl methosulfate form is obtained by treating any of the non-quaternary anthraquinone compounds with dimethyl sulfate. Any other quaternizing agent, such as those disclosed herein, can be used in place of dimethyl sulfate. The nature of the quaternizing agent appears to be immaterial insofar as the dyeing properties of the quaternary ammonium anthraquinone compound obtained are concerned.

Inasmuch as the new quaternary ammonium anthraquinone compounds of our invention are water soluble they are applied to the acrylonitrile polymer textile material from their solution in water, preferably at the boil. The property of water solubility is of real importance because dyes are almost exclusively applied from an aqueous dyebath. Because the dyes are water soluble the manufacturer thereof is relieved from the costly process of preparing mixes or dispersions that will form suspensions of finely divided solids and the dyer is relieved from the necessity of adding other substances in order to prevent the suspension or emulsion from breaking. If the dye suspension or emulsion breaks, uneven dyeing of the goods results and the dye fails to deliver the full money value of which it is capable.

The non-quaternary anthraquinone compounds of our invention are water-insoluble. They are applied to acrylonitrile polymer textile materials in the form of an aqueous dispersion.

The following example illustrates how the non-quaternary anthraquinone compounds of our invention can be used to dye acrylonitrile polymer textile materials.

EXAMPLE A 16.7 milligrams of the dye compound prepared in Example 7 were disolved by warming in 5 cc. of ethylene glycol monomethyl ether. 20 cc. of a 1% aqueous solution of Igepon T

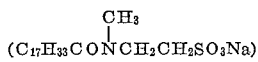

were added and the volume brought to 200 cc. by the addition of water at 50° C. Five cc. of a 30% aqueous solution of formic acid were added, followed by 5 grams of Verel acrylic fabric. The temperature was brought to 90° C. and held there for 1 hour. The cloth was then rinsed in hot water and allowed to dry. It was dyed an attractive orange shade having excellent fastness to light and good fastness to gas, washing and sublimation. Similar results are obtained when Orlon 42 fabric is used instead of Verel fabric.

The following example illustrates how the quaternary ammonium anthraquinone compounds of our invention can be applied to acrylonitrile polymer textile materials.

EXAMPLE B 16.7 milligrams of the dye product of Example 3 were dissolved in 200 cc. of water and 5 grams of Verel acrylic fabric were added. The temperature was raised to about 90° C. and 5 cc. of a 5% aqueous solution of formic or acetic acid were added. The temperature was maintained at about 90° for 1 hour. The goods were then removed from the dye bath, rinsed in hot water and allowed to dry. The Verel fabric was dyed an attractive orange shade having excellent fastness to light and good fastness to washing, gas and sublimation. Similar results are obtained when an Orlon 42 fabric is dyed.

In the case of materials made of Verel acrylic fiber the dyebath temperature should not exceed 90° C. in order to avoid damage to the fiber. Dyeing can be carried out at the boil in the case of Orlon 42 acrylic fiber.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. An anthraquinone compound of the formula:

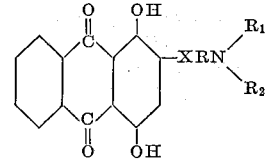

wherein X represents a member selected from a class consisting of —S— and —$SO_2$—, R represents alkylene of two to three carbon atoms, $R_1$ and $R_2$ each represents a member of the class consisting of hydrogen, alkyl of one to four carbon atoms and allyl and wherein

collectively represents a member of the class consisting of morpholino, piperidino, 4-methylpiperidino and 4-methylpiperazino.

2. An anthraquinone compound of the formula:

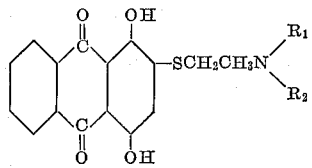

wherein $R_1$ and $R_2$ each represents alkyl having 1 to 4 carbon atoms.

3. The anthraquinone compound having the formula:

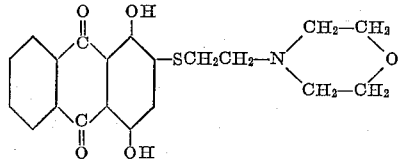

4. The anthraquinone compound having the formula:

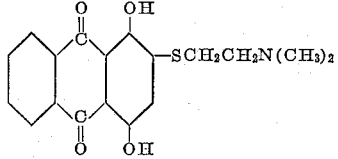

5. The anthraquinone compound having the formula:

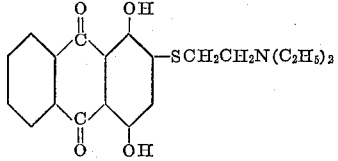

6. The anthraquinone compound having the formula:

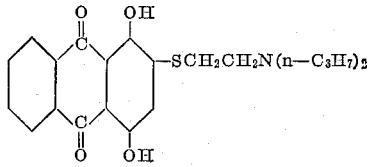

7. The anthraquinone compound having the formula:

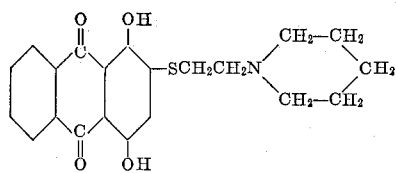

8. A quaternary ammonium salt of a compound of claim 1.

9. A quaternary ammonium salt of the compound of claim 3.

10. A quaternary ammonium salt of the compound of claim 5.

References Cited by the Examiner
UNITED STATES PATENTS

| | | | |
|---|---|---|---|
| 2,640,059 | 5/1953 | Salvin et al. | 260—272 |
| 2,759,940 | 8/1956 | Bucheler et al. | 260—371 |
| 2,871,239 | 1/1959 | D'Amico | 260—247.1 |
| 2,900,216 | 8/1959 | Schwechten et al. | 8—39 |
| 2,972,622 | 2/1961 | Grossman | 260—380 |
| 3,084,015 | 4/1963 | Grossmann | 8—39 |

IRVING MARCUS, *Primary Examiner.*

NICHOLAS S. RIZZO, *Examiner.*